United States Patent
Amaru et al.

(10) Patent No.: US 10,049,174 B2
(45) Date of Patent: Aug. 14, 2018

(54) EXACT DELAY SYNTHESIS

(71) Applicant: Synopsys, Inc., Mountain View, CA (US)

(72) Inventors: Luca Gaetano Amaru, Santa Clara, CA (US); Patrick Vuillod, St. Bernard du Touvet (FR); Jiong Luo, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/382,406

(22) Filed: Dec. 16, 2016

(65) Prior Publication Data

US 2018/0173818 A1 Jun. 21, 2018

(51) Int. Cl.
*G06F 9/455* (2018.01)
*G06F 17/50* (2006.01)

(52) U.S. Cl.
CPC ........ *G06F 17/505* (2013.01); *G06F 17/5031* (2013.01)

(58) Field of Classification Search
USPC ........................................ 716/104, 106, 108
See application file for complete search history.

(56) References Cited

U.S. PATENT DOCUMENTS

| | | | | |
|---|---|---|---|---|
| 5,359,537 A * | 10/1994 | Saucier | ................. | G06F 17/505 716/105 |
| 5,508,937 A * | 4/1996 | Abato | ................. | G06F 17/5031 716/134 |
| 6,405,345 B1 * | 6/2002 | Ginetti | ................. | G06F 17/505 716/104 |
| 6,557,144 B1 * | 4/2003 | Lu | ................. | G06F 17/505 716/122 |
| 6,714,902 B1 * | 3/2004 | Chao | ................. | G06F 17/5031 703/13 |
| 7,219,048 B1 * | 5/2007 | Xu | ................. | G06F 17/5031 703/19 |
| 8,788,995 B1 * | 7/2014 | Kumar | ................. | G06F 17/5031 716/110 |
| 8,832,614 B2 * | 9/2014 | Vrudhula | ................. | G06F 17/505 703/16 |
| 2011/0191731 A1 * | 8/2011 | Walker | ................. | G06F 17/50 716/108 |
| 2011/0191738 A1 * | 8/2011 | Walker | ................. | G06F 17/50 716/119 |

* cited by examiner

*Primary Examiner* — Brian Ngo
(74) *Attorney, Agent, or Firm* — Park, Vaughan, Fleming & Dowler LLP; Laxman Sahasrabuddhe

(57) ABSTRACT

Systems and techniques for optimizing timing of an integrated circuit (IC) design are described. A logic-function identifier can be determined based on a fan-in combinational-logic-cone, wherein the logic-function identifier corresponds to a logic function that is implemented by the fan-in combinational-logic-cone. An arrival-time-pattern identifier can be determined based on a set of arrival times at inputs of the fan-in combinational-logic-cone. A database lookup can be performed based on the logic-function identifier and the arrival-time-pattern identifier to obtain an optimized combinational-logic-cone. Next, the fan-in combinational-logic-cone can be replaced with the optimized combinational-logic-cone in the IC design.

20 Claims, 7 Drawing Sheets

| A | B | F0 | F1 | F2 | F3 | F4 | F5 | F6 | F7 | F8 | F9 | F10 | F11 | F12 | F13 | F14 | F15 |
|---|---|----|----|----|----|----|----|----|----|----|----|-----|-----|-----|-----|-----|-----|
| 0 | 0 | 0  | 0  | 0  | 0  | 0  | 0  | 0  | 0  | 1  | 1  | 1   | 1   | 1   | 1   | 1   | 1   |
| 0 | 1 | 0  | 0  | 0  | 0  | 1  | 1  | 1  | 1  | 0  | 0  | 0   | 0   | 1   | 1   | 1   | 1   |
| 1 | 0 | 0  | 0  | 1  | 1  | 0  | 0  | 1  | 1  | 0  | 0  | 1   | 1   | 0   | 0   | 1   | 1   |
| 1 | 1 | 0  | 1  | 0  | 1  | 0  | 1  | 0  | 1  | 0  | 1  | 0   | 1   | 0   | 1   | 0   | 1   |

Logic-function identifier = "0"

Logic-function identifier = "9"

EXACT DELAY SYNTHESIS

TECHNICAL FIELD

This disclosure relates to integrated circuits (ICs). More specifically, this disclosure relates to timing optimization in IC designs.

BACKGROUND

Related Art

Advances in process technology and an almost unlimited appetite for consumer electronics have fueled a rapid increase in the size and complexity of IC designs. Software tools can be used to perform various operations on IC designs, e.g., creating and editing schematics and layouts, synthesizing, optimizing, and verifying IC designs, etc. What are needed are high-performance user-friendly software tools that enable an IC designer to create IC designs that reduce the overall IC design time and/or improve the overall quality of results (QoR).

SUMMARY

Some embodiments described herein feature systems and techniques for optimizing timing of an IC design. Some embodiments can determine a logic-function identifier based on a fan-in combinational-logic-cone, wherein the logic-function identifier corresponds to a logic function that is implemented by the fan-in combinational-logic-cone. Next, the embodiments can determine an arrival-time-pattern identifier based on a set of arrival times at inputs of the fan-in combinational-logic-cone. The embodiments can then determine an optimized combinational-logic-cone by performing a database lookup based on the logic-function identifier and the arrival-time-pattern identifier. Next, the embodiments can replace the fan-in combinational-logic-cone with the optimized combinational-logic-cone in the IC design.

In some embodiments, determining the arrival-time-pattern identifier based on the set of arrival times at the inputs of the fan-in combinational-logic-cone can comprise: (1) subtracting a minimum arrival time in the set of arrival times from each arrival time in the set of arrival times; (2) for each arrival time t other than the maximum arrival time tmax in the set of arrival times, setting t equal to the maximum of (tmax−t) and (tmax−T), wherein T is a threshold arrival time value that depends on the logic function; and (3) subtracting a minimum arrival time in the set of arrival times from each arrival time in the set of arrival times. Note that each arrival-time-pattern identifier can correspond to an infinite number of possible sets of arrival times.

In some embodiments, the logic-function identifier can be a $2^n$-bit integer, wherein n is the number of inputs of the fan-in combinational-logic-cone. Specifically, each bit in the $2^n$-bit integer can correspond to a binary value in a truth table for the logic function that is implemented by the fan-in combinational-logic-cone.

Prior to determining the logic-function identifier based on the fan-in combinational-logic-cone, some embodiments can (1) determine timing slacks for a set of pins in the IC design; (2) identify a pin in the IC design for timing optimization based on the timing slacks; and (3) determine the fan-in combinational-logic-cone by starting at the pin and traversing the IC design in an output-to-input direction. Specifically, the IC design can be traversed in the output-to-input direction until the number of inputs of the fan-in combinational-logic-cone is a desired value, e.g., three, four, or five inputs.

DETAILED DESCRIPTION

Figure 1A:
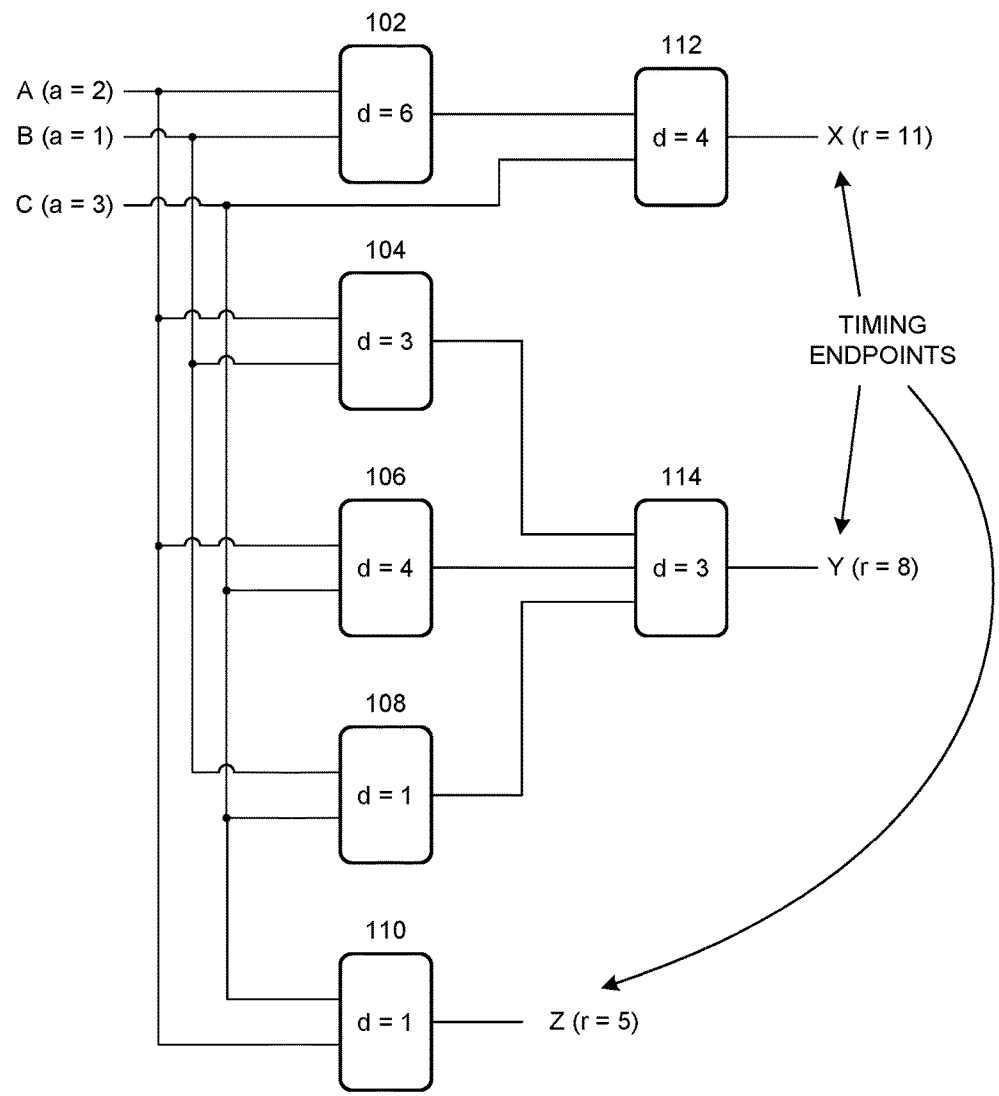
FIGS. 1A-1C illustrate how timing information can be propagated in an IC design.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of IC Design and Manufacturing

IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results (QoR). Some examples of IC design steps and the associated software tools are described below. These examples are for illustrative purposes only and are not intended to limit the embodiments to the forms disclosed.

Some IC design software tools enable IC designers to describe the functionality that the IC designers want to implement. These tools also enable IC designers to perform what-if planning to refine functionality, check costs, etc. During logic design and functional verification, the HDL (hardware description language), e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence with the HDL code. Embodiments described herein can be used in multiple steps of the IC design flow. Specifically, some embodiments can be used during synthesis.

During design planning, an overall floorplan for the chip can be constructed and analyzed for timing and top-level routing. During physical implementation, circuit elements can be positioned in the layout and can be electrically coupled.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Static Timing Analysis (STA)

An important performance metric for an IC design is the clock frequency at which the manufactured IC can reliably operate. STA is an invaluable tool for determining whether an IC design will reliably operate at a given clock frequency. Since STA uses an approximate model for the IC design, even if STA concludes that an IC design will reliably operate at a particular clock frequency, the IC design may fail to do so. Nevertheless, STA has emerged as the method of choice for verifying timing constraints for large IC designs because STA performs a reasonably accurate timing analysis within a reasonable amount of time.

In STA, the required times and arrival times are propagated through a graph-based representation of the IC design. Timing violations in the IC design can then be determined using the required times and the arrival times. Note that there are at least two types of timing violations: setup time violation and a hold time violation. In a setup time violation, a signal reaches a pin later than it is supposed to reach, e.g., a setup time violation may occur when a signal reaches a register input after the clock transition. In a hold time violation, a signal does not remain stable for a sufficient amount of time, e.g., a signal at a register's input may change before the register can capture the signal's value. General background information on static timing analysis and propagation of timing information can be found in Luciano Lavagno (Editor), Louis Scheffer (Editor), Grant Martin (Editor), *EDA for IC Implementation, Circuit Design, and Process Technology (Electronic Design Automation for Integrated Circuits Handbook)*, CRC Press, 1$^{st}$ Ed., March 2006.

Figure 1B:
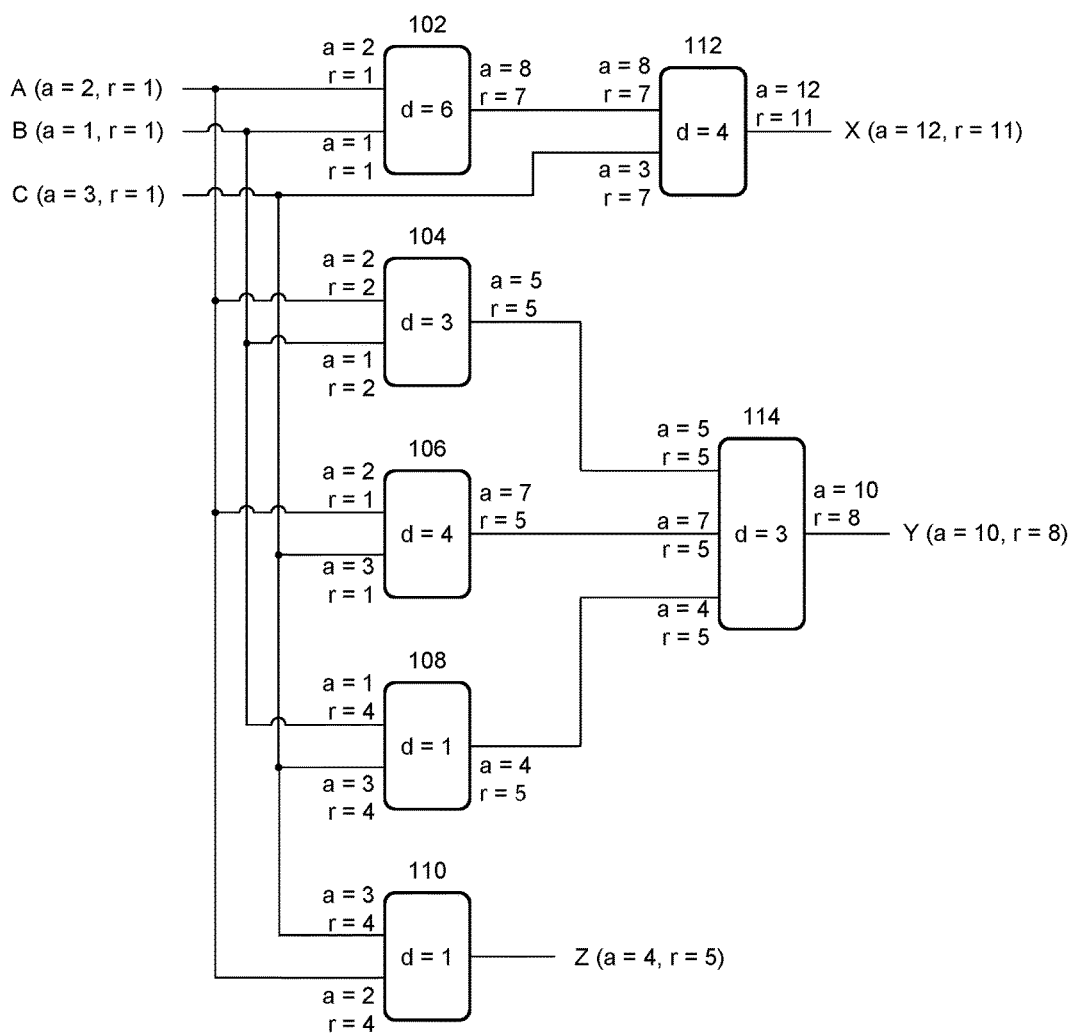
Figure 1C:
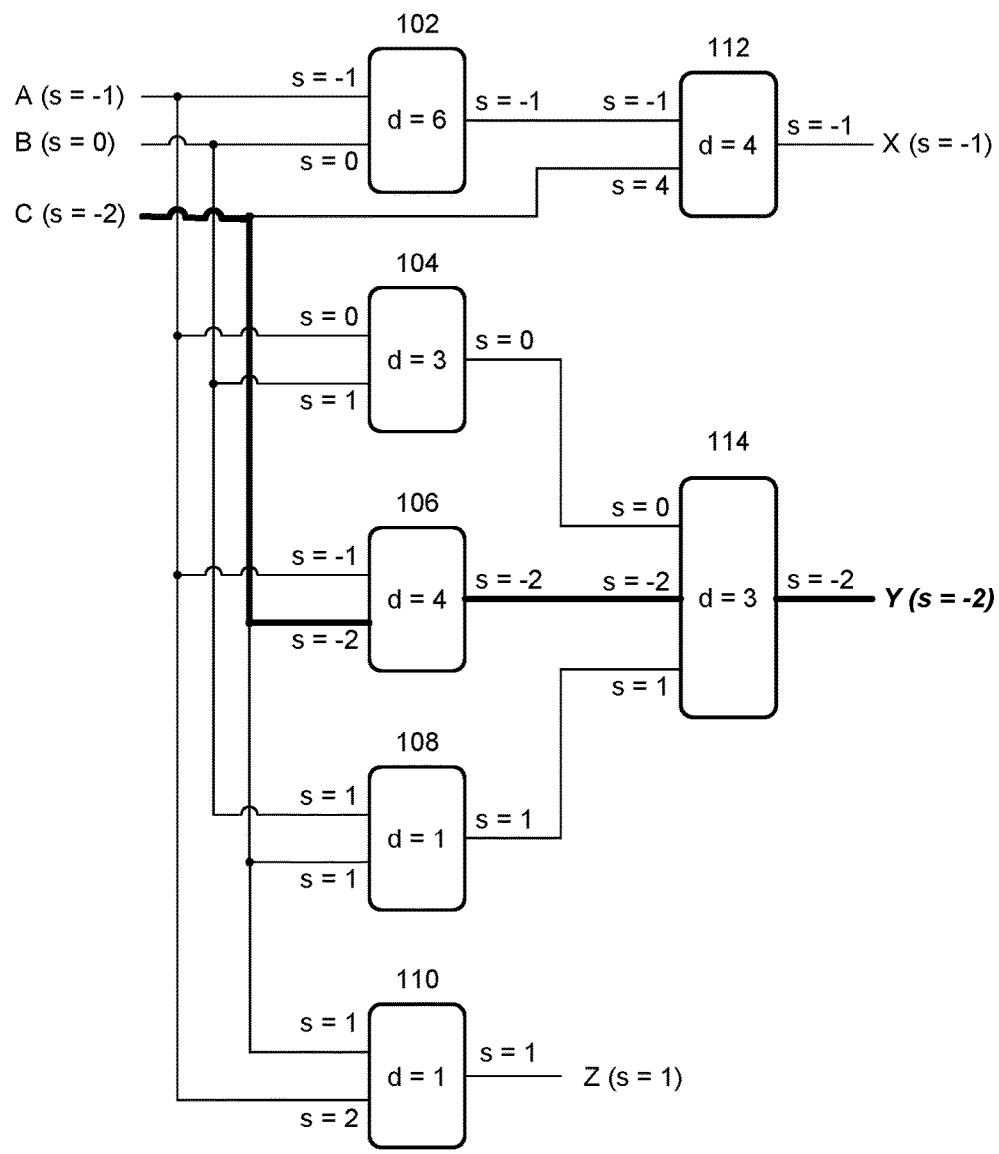

FIGS. 1A-1C illustrate how timing information can be propagated in an IC design. FIG. 1A illustrates an IC design with delay values, arrival times, and required times. IC design 100 includes circuit blocks 102, 104, 106, 108, 110, 112, and 114. A circuit block can be an arbitrary portion of an IC design. Specifically, a circuit block can include one or more cells and/or one or more gates. IC design 100 has three inputs A, B, and C, and three outputs X, Y, and Z. The term "timing endpoints" or "endpoints" for short can generally be any set of terminals or pins (e.g., inputs or outputs of combinational or sequential circuit elements) in the IC design where the timing information is of interest. The timing endpoints are typically the outputs of an IC design, or an input of a register in the IC design. The timing endpoints in FIGS. 1A-1C are outputs X, Y, and Z because we are interested in the timing information at these points.

The delay for each circuit block is shown within the circuit block. For example, circuit block 102 includes text "d=6", which specifies that circuit block 102 has a delay of 6 time units (for example, if each time unit is equal to 5 ns, then a delay of 6 time units will be equal to 30 ns). A simplified delay model has been used in FIGS. 1A-1C for the sake of clarity and ease of discourse. A more complicated delay model can have different delay values for each input/output pair, considering output loading and input transition values. Further, the delay model can have different delay values for different rise and fall transition times. Additionally, the delay model may consider various forms of net (wire) delays and parasitic capacitances. Although FIGS. 1A-1C use a simplified delay model, it will be apparent to a person having ordinary skill in the art that techniques and systems described in this disclosure are readily applicable to more complex delay models.

The arrival times at inputs A, B, and C are shown next to the inputs. For example, the text "a=2" appears next to input A, which indicates that the arrival time at input A is equal to 2 time units. The arrival time at a pin indicates when the signal arrives at the pin. The required times at outputs X, Y, and Z are shown next to the outputs. For example, the text "r=11" appears next to output X, which indicates that the required time at output X is equal to 11 time units. The required time at a pin indicates when the signal is required to arrive at the pin.

FIG. 1B illustrates the result of propagating arrival times in a forward direction (i.e., from inputs to outputs) and propagating required times in a backward direction (i.e., from outputs to inputs) through the IC design. At each circuit block, the worst-case arrival time is propagated forward. Similarly, the worst-case required time is propagated backward. Note that the definition of "worst case" depends on whether the timing information is being propagated for determining setup violations or for determining hold violations. Specifically, in the case of setup violations, the maximum values are propagated, whereas in the case of hold violations, the minimum values are propagated.

FIG. 1C illustrates how slack values can be determined. At each pin, the arrival time is subtracted from the required time to obtain the slack value. For example, the slack value at the output of circuit block 102 is equal to −2 (6-8). Slack values for other pins can be determined in a similar fashion.

The slack value indicates whether a timing constraint is being violated or not. Typically, a user can specify an acceptable slack value, that is, a slack threshold. The slack at a pin can be compared with the slack value to determine whether or not the pin has violated a timing constraint. Different slack thresholds can be used for different parts of the IC design. Further, the definition of a violation can depend on the type of the timing constraint. For example, for one type of timing constraint, a violation may occur if the slack value is less than the threshold, whereas for another type of timing constraint, a violation may occur if the slack value is greater than the threshold. Typically, the slack threshold is zero for setup timing constraints, and a violation occurs when the slack value is negative. A path is a violating path if the slack at the path's endpoint is a violating slack. The worst negative slack corresponds to the worst timing or worst slack of the IC design.

The IC design 100 in FIG. 1C has two endpoints, namely X and Y, with negative slack values: endpoint X has slack value −1 and endpoint Y has slack value −2. Endpoint Z, however, has a positive slack value 1. The critical path for endpoint Y is shown in bold, tracing the path starting at primary input C through circuit block 106 and circuit block 114 to endpoint Y. The path terminating at endpoint Z is not a violating path because its slack value is positive (in this example, we are assuming that a slack value is violating if it is negative). The critical path length or the critical path delay of a critical path is the total delay along the critical path. The critical path delay can be determined by aggregating the delays along the critical path. For example, the critical path delay of the critical path between input C and output Y is 7 time units.

Exact Delay Synthesis

Consider the following timing optimization problem: determine a circuit implementation that minimizes the arrival time at an output of the circuit implementation given (1) a logic function (i.e., a Boolean function) that the circuit implementation is supposed to implement, (2) a set of arrival times at the inputs of the Boolean function, and (3) a set of primitive gates with associated delay values that can be used for creating the circuit implementation. Existing approaches include techniques based on Huffman decomposition, Shannon co-factoring, redundancy removal, etc. These approaches are based on heuristics, and as such they do not guarantee that the globally optimal circuit implementation will be found. In contrast to such approaches, some embodiments described herein determine and use the globally optimal solution to the above-mentioned timing optimization problem.

Specifically, some embodiments described herein create a database of optimal circuit implementations. Given (1) a logic function that the circuit implementation is supposed to implement, (2) a set of arrival times at the inputs of the logic function, and (3) a set of primitive gates with associated delay values that can be used for creating the circuit implementation, the embodiments create a database of optimal circuit implementations that can be indexed based on the logic function and the set of arrival times at the inputs of the logic function.

There are many challenges for computing such a database. First, the arrival times are unbounded, i.e., each arrival time can potentially take on a value between 0 and +∞. If there are n inputs, then we need to account for $\infty^n$ sets of arrival times. Second, the number of possible Boolean functions (i.e., logic functions) is super exponential in the number of inputs, i.e., there are $2^{2^n}$ possible Boolean functions with n inputs. Third, the delay computation depends on the given library of gates, and the gate delay depends on the specific semiconductor manufacturing technology that is used for fabricating the IC chip. Moreover, the delay ratio between a basic 2-input AND gate and more complex gates (e.g., a 2-input XOR gate) is not fixed.

Of these challenges, handling the potentially $\infty^n$ sets of arrival times is the most difficult. Some embodiments described herein map the set of arrival times to an arrival time pattern that is selected from a finite set of arrival time patterns without compromising the optimality of the final circuit implementation. In other words, the optimal circuit implementation for a given arrival time pattern is guaranteed to be the optimal circuit implementation for all of the sets of arrival times (which are infinite in number) that map to the given arrival time pattern. For example, for a 4-input Boolean function, the $\infty^4$ sets of arrival times can be mapped to 280 distinct arrival time patterns. Likewise, for a 5-input Boolean function, the $\infty^5$ sets of arrival times can be mapped to about 1,000 distinct arrival time patterns. Some embodiments described herein assume that a 2-input AND gate and a 2-input OR gate have a unit delay. More complex gates are assumed to have delays that are represented in terms of this unit delay, e.g., a 2-input XOR gate or MUX gates have a delay of 2 units. Moreover, arrival times are normalized based on the unit delays of the 2-input AND gate and the 2-input OR gate.

Figure 2:
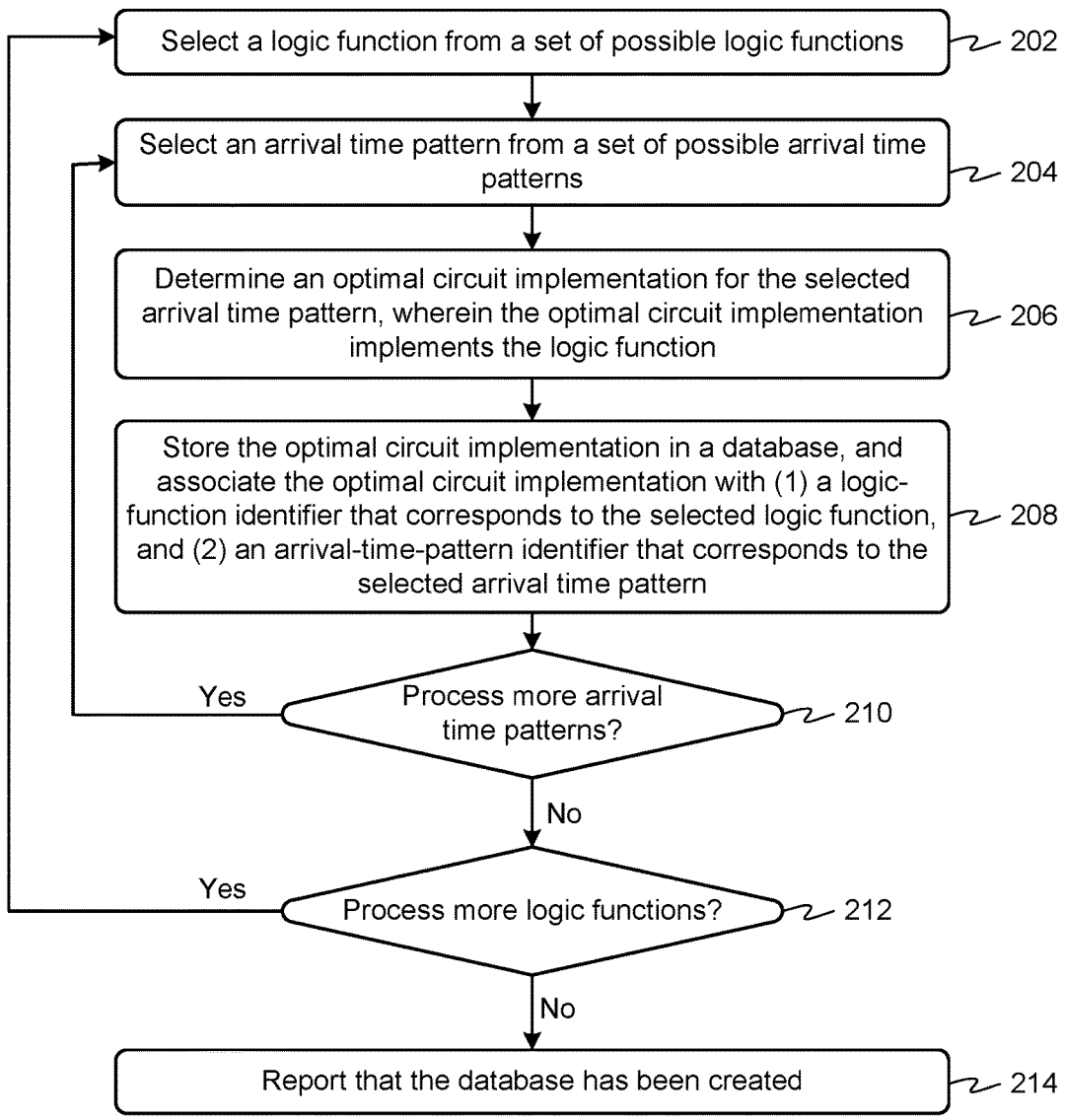
FIG. 2 illustrates a process for creating a database of optimal circuit implementations in accordance with some embodiments described herein.

FIG. 2 illustrates a process for creating a database of optimal circuit implementations in accordance with some embodiments described herein. The process can begin by selecting a logic function from a set of possible logic functions (block 202). Next, the process can select an arrival time pattern from a set of possible arrival time patterns (block 204). The process can then determine an optimal circuit implementation for the selected arrival time pattern, wherein the optimal circuit implementation implements the logic function (block 206). Next, the process can store the optimal circuit implementation in a database, and associate the optimal circuit implementation with (1) a logic-function identifier that corresponds to the selected logic function, and (2) an arrival-time-pattern identifier that corresponds to the selected arrival time pattern (block 208). The association is stored in the database, thereby allowing the optimal circuit implementation to be looked-up based on the logic-function identifier and the arrival-time-pattern identifier. The process can then check if more arrival time patterns need to be processed (block 210). If so, the process can return to block 204 and select the next arrival time pattern. Otherwise, the process can check if more logic functions need to be processed (block 212). If so, the process can return to block 202 and select the next logic function. Otherwise, the process can report that the database has been created (block 214). In an alternative embodiment, the location of blocks 210 and 212 in FIG. 2 can be swapped.

Figures 3, 4:
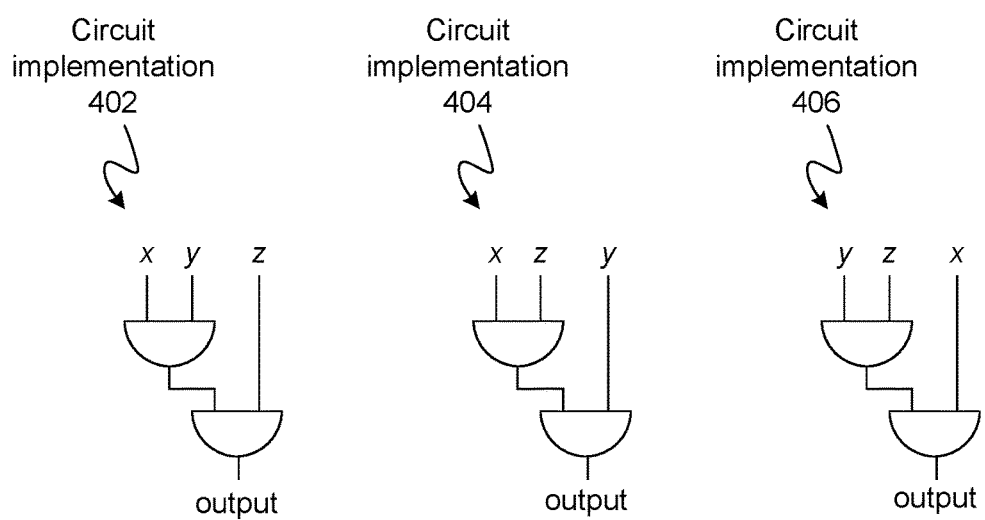
FIG. 3 illustrates how a logic-function identifier can be determined for a logic function in accordance with some embodiments described herein.
FIG. 4 illustrates how the optimal circuit implementation can depend on the arrival time in accordance with some embodiments described herein.

FIG. 3 illustrates how a logic-function identifier can be determined for a logic function in accordance with some embodiments described herein. As illustrated by the truth tables in FIG. 3, there are a total of $2^{2^2}=16$ possible 2-input Boolean functions (the inputs are labeled "A" and "B", and the functions are labeled "F0" through "F15"). In some embodiments, the truth table for each Boolean function can be interpreted as an integer, and the value of this integer can be used as the logic-function identifier. As shown in FIG. 3, the logic-function identifier for function F0 can be "0" and the logic-function identifier for function F9 can be "9." More generally, the logic-function identifier can be a $2^n$-bit integer, wherein n is the number of inputs of the logic function, and wherein each bit in the $2^n$-bit integer can correspond to a binary value in a truth table for the logic function.

FIG. 4 illustrates how the optimal circuit implementation can depend on the arrival time in accordance with some embodiments described herein. Circuit implementations 402, 404, and 406 are three possible circuit implementations for the 3-input logic function "x∧y∧z." In circuit implementation 402, the "x" and "y" inputs are delayed by 1 unit more than the "z" input because the "x" and "y" inputs pass through two AND gates, whereas the "z" input passes through only one AND gate. Likewise, in circuit implementation 404, the "x" and "z" inputs are delayed by 1 unit more than the "y" input, and in circuit implementation 406, the "y" and "z" inputs are delayed by 1 unit more than the "x" input.

Note that the arrival time at the output depends on the circuit implementation and the arrival times at the inputs. Therefore, the optimal circuit implementation (i.e., the circuit implementation that results in the minimum arrival time at the output) depends on the set of arrival times at the inputs. For example, if the arrival times at inputs "x", "y", and "z" are 1, 1, and 2, then circuit implementation 402 will be the optimal circuit implementation because it will result in an arrival time of 3 units at the output (which is the minimum arrival time at the output across all three circuit implementations), whereas the other two circuit implementations 404 and 406 will result in an arrival time of 4 units at the output. Likewise, if the arrival times at inputs "x", "y", and "z" are 1, 2, and 1, then circuit implementation 404 will be the optimal circuit implementation because it will result in the minimum arrival time at the output.

Figure 5:
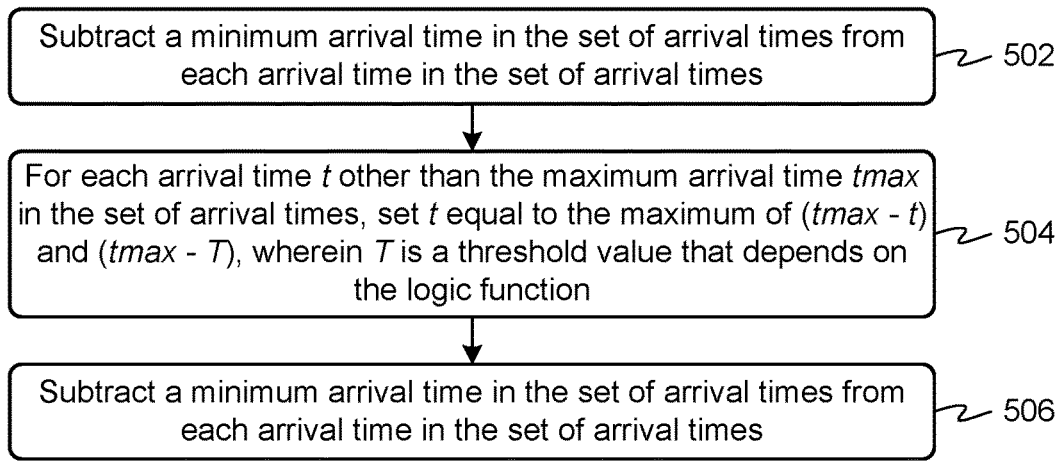
FIG. 5 illustrates a process for determining an arrival-time-pattern identifier in accordance with some embodiments described herein.

FIG. 5 illustrates a process for determining an arrival-time-pattern identifier in accordance with some embodiments described herein. The process can begin by subtracting a minimum arrival time in the set of arrival times from each arrival time in the set of arrival times (block 502). The insight for this operation is that a common delay offset does not change the best delay implementation.

Next, for each arrival time t other than the maximum arrival time tmax in the set of arrival times, the process can set t equal to the maximum of (tmax−t) and (tmax−T), wherein T is a threshold value that depends on the logic function (block 504). The threshold value T can correspond to the maximum non-degenerate depth for the logic function. In other words, the threshold T can be equal to the height of a binary decision diagram (BDD) corresponding to the logic function when the BDD is decomposed into the primitive gates. The insight is that if the difference in arrival time between two inputs is larger than the maximum non-degenerate depth, then the difference can be normalized without affecting the best delay implementation because if the difference is so large, then tmax is going to determine the output arrival time. The process can then subtract a minimum arrival time in the set of arrival times from each arrival time in the set of arrival times (block 506). Note that, in the final set of arrival times, each arrival time is an integer between 0 and T. Therefore, the total number of distinct arrival time patterns for n inputs is $n^T$.

For example, suppose the arrival times for the 3-input function described in FIG. 4 are (5, 5, 105), i.e., suppose the arrival times at inputs "x", "y", and "z" are 5, 5, and 105, respectively. In block 502, the process can modify the set of arrival times to (0, 0, 100) by subtracting "5" (which is the minimum arrival time in the set of arrival times) from each arrival time in the set of arrival times. Note that the threshold T is equal to 3 for the 3-input function described in FIG. 4. Therefore, in block 504, the process can modify the set of arrival times to (97, 97, 100). Finally, in block 506, the process can modify the set of arrival times to (0, 0, 3) by subtracting "97" (which is the minimum arrival time in the set of arrival times) from each arrival time in the set of arrival times. Thus, the final set of arrival times is (0, 0, 3). The final set of arrival times can be used itself as the arrival-time-pattern identifier, e.g., the string with comma-delimited-values "0,0,3" can be used as the arrival-time-pattern identifier. Alternatively, the process can convert the final set of arrival times into an integer, e.g., by multiplying each arrival time value by a corresponding coefficient and summing the individual products. For example, in one embodiment, the final set of arrival times $(t_1, t_2, t_3)$ can be converted into the integer value $(70 \times t_1 + 10 \times t_2 + t_3)$, which can then be used as the arrival-time-pattern identifier. In some embodiments, the coefficients can be chosen so that each distinct arrival time pattern maps to a distinct integer, i.e., no two distinct arrival time patterns map to the same integer.

Figure 6:
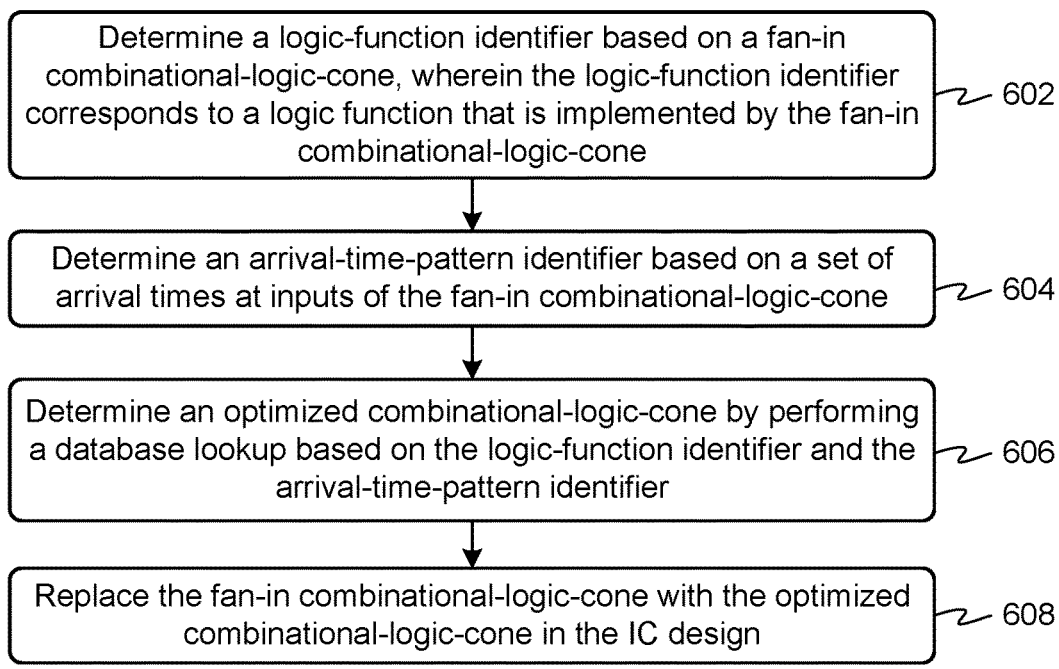
FIG. 6 illustrates a process for performing timing optimization in an IC design in accordance with some embodiments described herein.

FIG. 6 illustrates a process for performing timing optimization in an IC design in accordance with some embodiments described herein. The process can begin by determining a logic-function identifier based on a fan-in combinational-logic-cone, wherein the logic-function identifier corresponds to a logic function that is implemented by the fan-in combinational-logic-cone (block 602).

Figure 7:
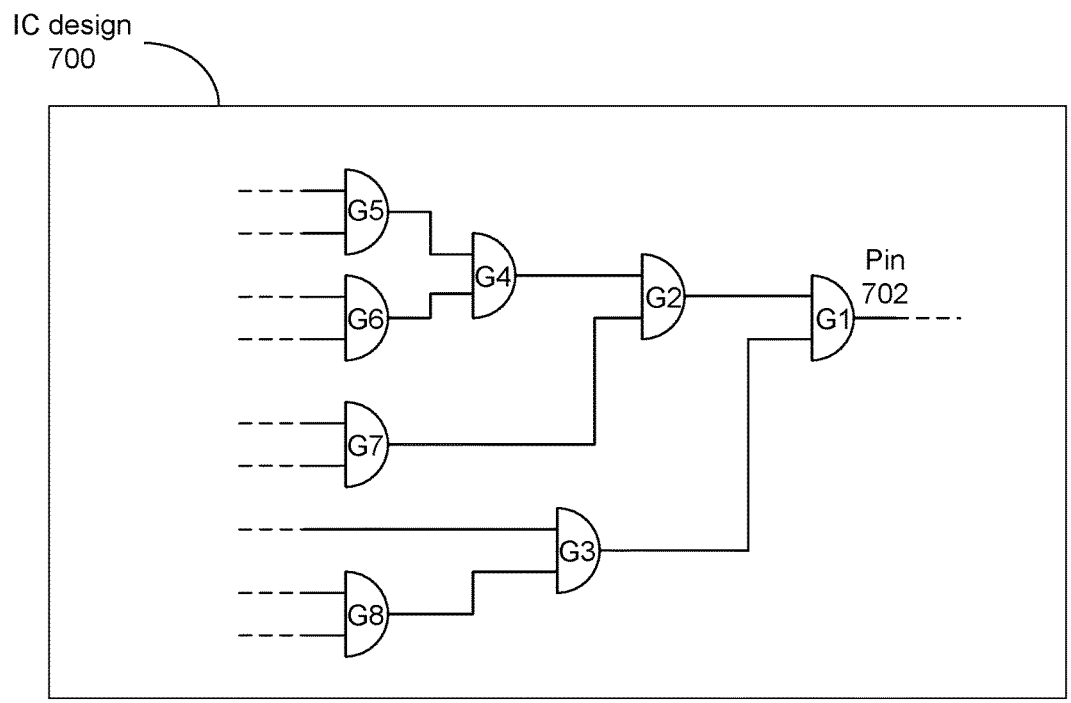
FIG. 7 illustrates how a fan-in combinational-logic-cone can be determined in accordance with some embodiments described herein.

Prior to block 602, the process can (1) determine timing slacks for a set of pins in the IC design, (2) identify a pin in the IC design for timing optimization based on the timing slacks, and (3) determine a fan-in combinational-logic-cone by starting at the pin and traversing the IC design in an output-to-input direction. FIG. 7 illustrates how a fan-in combinational-logic-cone can be determined in accordance with some embodiments described herein. IC design 700 can include combinational gates G1-G8. Note that the gate symbol used for illustrating gates G1-G8 can represent any logical operation, and does not necessarily represent the "AND" operation, e.g., G1 can be an "OR" gate, G2 can be an "AND" gate, etc. Let us assume that the process has selected pin 702 (i.e., output pin of gate G1) for timing optimization. The process can then determine a fan-in combinational-logic-cone by starting at pin 702 and traversing IC design 700 in an output-to-input direction until a desired portion of the IC design has been traversed. In some embodiments, the IC design can be traversed in the output-to-input direction until the number of inputs of the fan-in combinational-logic-cone is equal to a predetermined number, e.g., three, four, five, etc.

For example, in FIG. 7, if the number of inputs of the fan-in combinational-logic-cone is desired to be 3, then the process can select one of the following sets of gates to be in the fan-in combinational-logic-cone: {G1, G2} or {G1, G3}. Likewise, if the number of inputs of the fan-in combinational-logic-cone is desired to be 4, then the process can select one of the following sets of gates to be in the fan-in combinational-logic-cone: {G1, G2, G3}, {G1, G3, G8}, {G1, G2, G4}, or {G1, G2, G7}. Once the fan-in combinational-logic-cone is determined, the process can then determine the logic function that is implemented by the combinational-logic-cone, and determine the logic-function identifier based on the logic function. For example, the process can determine the truth table for the fan-in combinational-logic-cone, and use the binary values in the truth table to construct the logic-function identifier as explained in reference to FIG. 3.

Next, referring to the process shown in FIG. 6, the process can determine an arrival-time-pattern identifier based on a set of arrival times at inputs of the fan-in combinational-logic-cone (block 604). For example, if the fan-in combinational-logic-cone includes gates {G1, G2, G3}, then the set of arrival times (which includes four arrival time values) includes the arrival times at the inputs of gates G2 and G3. Once the set of arrival times is determined, then the process illustrated in FIG. 5 can be used to determine the arrival-time-pattern identifier. The process can then determine an optimized combinational-logic-cone by performing a database lookup based on the logic-function identifier and the arrival-time-pattern identifier (block 606). Finally, the process can replace the fan-in combinational-logic-cone with the optimized combinational-logic-cone in the IC design (block 608).

IC Design System

Figure 8:
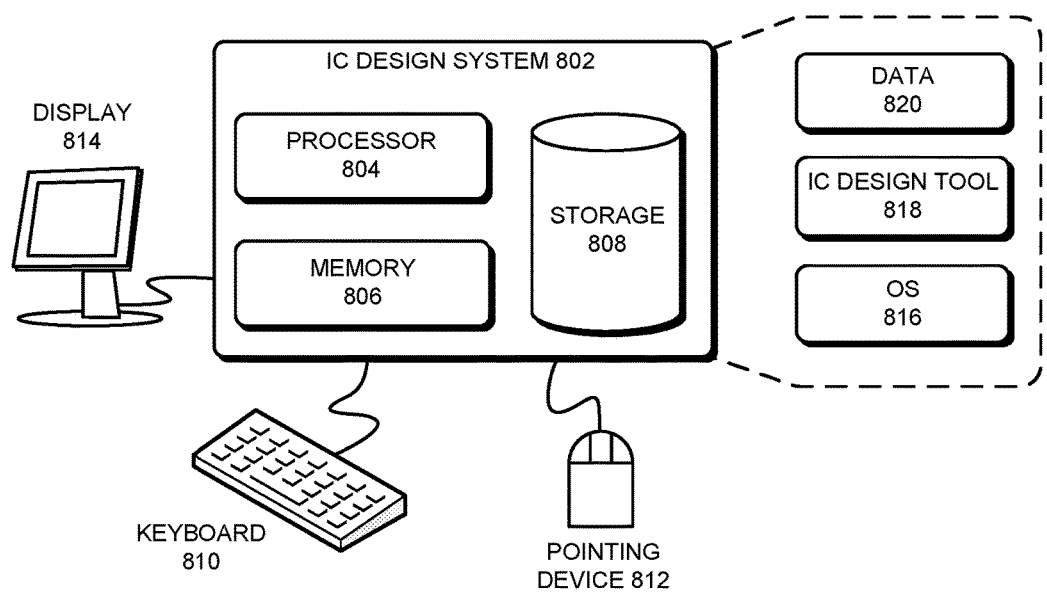
FIG. 8 illustrates an IC design system in accordance with some embodiments described herein.

The term "IC design system" generally refers to a hardware-based system that facilitates designing ICs. FIG. 8 illustrates an IC design system in accordance with some embodiments described herein. IC design system 802 can include processor 804, memory 806, and storage device 808. Specifically, memory locations in memory 806 can be addressable by processor 804, thereby enabling processor 804 to access (e.g., via load/store instructions) and manipulate (e.g., via logical/floating point/arithmetic instructions) the data stored in memory 806. IC design system 802 can be coupled to display device 814, keyboard 810, and pointing device 812. Storage device 808 can store operating system 816, IC design tool 818, and data 820. Data 820 can include input required by IC design tool 818 and/or output generated by IC design tool 818.

IC design system 802 may automatically (or with user help) perform one or more operations that are implicitly or explicitly described in this disclosure. Specifically, IC design system 802 can load IC design tool 818 into memory 806, and IC design tool 818 can then be used to create a database of optimal circuit implementations, and to optimize IC designs by using the database.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions that, when executed by a computer, cause the computer to perform a method for optimizing an integrated circuit (IC) design, the method comprising:
   determining a logic-function identifier based on a fan-in combinational-logic-cone in the IC design, wherein the logic-function identifier corresponds to a logic function that is implemented by the fan-in combinational-logic-cone;
   determining an arrival-time-pattern identifier based on a set of arrival times at inputs of the fan-in combinational-logic-cone;
   determining an optimized combinational-logic-cone by performing a database lookup based on the logic-function identifier and the arrival-time-pattern identifier;
   obtaining an optimized IC design by replacing the fan-in combinational-logic-cone in the IC design with the optimized combinational-logic-cone; and
   providing the optimized IC design to a next step in an IC design and manufacturing process which, when completed, produces an IC chip that contains the optimized IC design.

2. The non-transitory computer-readable storage medium of claim 1, wherein determining the arrival-time-pattern identifier based on the set of arrival times at the inputs of the fan-in combinational-logic-cone comprises:
   subtracting a minimum arrival time in the set of arrival times from each arrival time in the set of arrival times;
   for each arrival time t other than the maximum arrival time tmax in the set of arrival times, setting t equal to the maximum of (tmax−t) and (tmax−T), wherein T is a threshold arrival time value that depends on the logic function; and
   subtracting a minimum arrival time in the set of arrival times from each arrival time in the set of arrival times.

3. The non-transitory computer-readable storage medium of claim 1, wherein the arrival-time-pattern identifier corresponds to an infinite number of possible sets of arrival times.

4. The non-transitory computer-readable storage medium of claim 1, wherein the logic-function identifier is a $2^n$-bit integer, wherein n is the number of inputs of the fan-in combinational-logic-cone.

5. The non-transitory computer-readable storage medium of claim 4, wherein each bit in the $2^n$-bit integer corresponds to a binary value in a truth table for the logic function that is implemented by the fan-in combinational-logic-cone.

6. The non-transitory computer-readable storage medium of claim 1, wherein prior to determining the logic-function identifier based on the fan-in combinational-logic-cone, the method further comprises:
   determining timing slacks for a set of pins in the IC design;
   identifying a pin in the IC design for timing optimization based on the timing slacks; and
   determining the fan-in combinational-logic-cone by starting at the pin and traversing the IC design in an output-to-input direction.

7. The non-transitory computer-readable storage medium of claim 6, wherein the IC design is traversed in the output-to-input direction until the number of inputs of the fan-in combinational-logic-cone is equal to a predetermined number.

8. An apparatus, comprising:
a processor; and
a non-transitory computer-readable storage medium storing instructions that, when executed by the processor, cause the apparatus to perform a method for optimizing an integrated circuit (IC) design, the method comprising:
determining a logic-function identifier based on a fan-in combinational-logic-cone in the IC design, wherein the logic-function identifier corresponds to a logic function that is implemented by the fan-in combinational-logic-cone;
determining an arrival-time-pattern identifier based on a set of arrival times at inputs of the fan-in combinational-logic-cone;
determining an optimized combinational-logic-cone by performing a database lookup based on the logic-function identifier and the arrival-time-pattern identifier;
obtaining an optimized IC design by replacing the fan-in combinational-logic-cone in the IC design with the optimized combinational-logic-cone; and
providing the optimized IC design to a next step in an IC design and manufacturing process which, when completed, produces an IC chip that contains the optimized IC design.

9. The apparatus of claim 8, wherein determining the arrival-time-pattern identifier based on the set of arrival times at the inputs of the fan-in combinational-logic-cone comprises:
subtracting a minimum arrival time in the set of arrival times from each arrival time in the set of arrival times;
for each arrival time t other than the maximum arrival time tmax in the set of arrival times, setting t equal to the maximum of (tmax−t) and (tmax−T), wherein T is a threshold arrival time value that depends on the logic function; and
subtracting a minimum arrival time in the set of arrival times from each arrival time in the set of arrival times.

10. The apparatus of claim 8, wherein the arrival-time-pattern identifier corresponds to an infinite number of possible sets of arrival times.

11. The apparatus of claim 8, wherein the logic-function identifier is a $2^n$-bit integer, wherein n is the number of inputs of the fan-in combinational-logic-cone.

12. The apparatus of claim 11, wherein each bit in the $2^n$-bit integer corresponds to a binary value in a truth table for the logic function that is implemented by the fan-in combinational-logic-cone.

13. The apparatus of claim 8, wherein prior to determining the logic-function identifier based on the fan-in combinational-logic-cone, the method further comprises:
determining timing slacks for a set of pins in the IC design;
identifying a pin in the IC design for timing optimization based on the timing slacks; and
determining the fan-in combinational-logic-cone by starting at the pin and traversing the IC design in an output-to-input direction.

14. The apparatus of claim 13, wherein the IC design is traversed in the output-to-input direction until the number of inputs of the fan-in combinational-logic-cone is equal to a predetermined number.

15. A method for optimizing an integrated circuit (IC) design, the method comprising:
determining, by using at least one processor, a logic-function identifier based on a fan-in combinational-logic-cone in the IC design, wherein the logic-function identifier corresponds to a logic function that is implemented by the fan-in combinational-logic-cone;
determining an arrival-time-pattern identifier based on a set of arrival times at inputs of the fan-in combinational-logic-cone;
determining an optimized combinational-logic-cone by performing a database lookup based on the logic-function identifier and the arrival-time-pattern identifier;
obtaining an optimized IC design by replacing the fan-in combinational-logic-cone in the IC design with the optimized combinational-logic-cone; and
providing the optimized IC design to a next step in an IC design and manufacturing process which, when completed, produces an IC chip that contains the optimized IC design.

16. The method of claim 15, wherein determining the arrival-time-pattern identifier based on the set of arrival times at the inputs of the fan-in combinational-logic-cone comprises:
subtracting a minimum arrival time in the set of arrival times from each arrival time in the set of arrival times;
for each arrival time t other than the maximum arrival time tmax in the set of arrival times, setting t equal to the maximum of (tmax−t) and (tmax−T), wherein T is a threshold arrival time value that depends on the logic function; and
subtracting a minimum arrival time in the set of arrival times from each arrival time in the set of arrival times.

17. The method of claim 15, wherein the arrival-time-pattern identifier corresponds to an infinite number of possible sets of arrival times.

18. The method of claim 15, wherein the logic-function identifier is a $2^n$-bit integer, wherein n is the number of inputs of the fan-in combinational-logic-cone.

19. The method of claim 18, wherein each bit in the $2^n$-bit integer corresponds to a binary value in a truth table for the logic function that is implemented by the fan-in combinational-logic-cone.

20. The method of claim 15, wherein prior to determining the logic-function identifier based on the fan-in combinational-logic-cone, the method further comprises:
determining timing slacks for a set of pins in the IC design;
identifying a pin in the IC design for timing optimization based on the timing slacks; and
determining the fan-in combinational-logic-cone by starting at the pin and traversing the IC design in an output-to-input direction.

* * * * *